United States Patent
Maffeis et al.

(10) Patent No.: US 7,552,550 B2
(45) Date of Patent: Jun. 30, 2009

(54) SELF-TAPPING STUD FOR RUBBER SUPPORTS OF SHOES, TYRES AND THE LIKE

(75) Inventors: Luca Maffeis, Gazzaniga (IT); Remo Maffeis, Gazzaniga (IT)

(73) Assignee: Bestgrip S.r.l., Gazzaniga (Bergamo) (IT)

( * ) Notice: Subject to any disclaimer, the term of this patent is extended or adjusted under 35 U.S.C. 154(b) by 336 days.

(21) Appl. No.: 10/565,441

(22) PCT Filed: Jul. 9, 2004

(86) PCT No.: PCT/EP2004/007551

§ 371 (c)(1),
(2), (4) Date: Jan. 20, 2006

(87) PCT Pub. No.: WO2005/013749

PCT Pub. Date: Feb. 17, 2005

(65) Prior Publication Data

US 2006/0263168 A1    Nov. 23, 2006

(30) Foreign Application Priority Data

Jul. 23, 2003    (IT) .......................... MI2003A1516

(51) Int. Cl.
*A43B 5/00*    (2006.01)
*A43C 15/02*   (2006.01)
*B60C 11/03*   (2006.01)

(52) U.S. Cl. .......................... 36/134; 36/67 D; 152/210

(58) Field of Classification Search .................... 36/134, 36/67 D; 152/210
See application file for complete search history.

(56) References Cited

U.S. PATENT DOCUMENTS

| 3,124,191 | A |   | 3/1964  | Forslund |
| 4,587,748 | A | * | 5/1986  | Collins .................... 361/127 |
| 5,458,174 | A | * | 10/1995 | Wessel .................... 152/210 |
| 5,782,017 | A |   | 7/1998  | Ortscheid |
| 5,897,177 | A |   | 4/1999  | Bergstrom |

FOREIGN PATENT DOCUMENTS

| DE | 31 48 059 | 6/1983 |
| GB | 12231 A | 3/1912 |

* cited by examiner

*Primary Examiner*—Ted Kavanaugh
(74) *Attorney, Agent, or Firm*—Young & Thompson

(57) ABSTRACT

A self-tapping stud for rubber supports of shoes, tires and the like includes a body presenting a threaded portion fixable into the rubber support and a head projecting from the support when the stud has been mounted. The threaded portion presents a thread provided with a free helical edge extending along a substantially cylindrical surface and presents a substantially conical or frusto-conical core, and a thread provided at its free start with a cutting edge which is oriented with the same inclination as the thread and can reach the core center. The stud mounting tool includes a seat for receiving the head or body of the stud as an exact fit, and an abutment surface adjacent to a mouth of the seat, enabling the stud to be screwed into the support until the abutment surface abuts against the support or until the surface of the first and second element mutually abut.

14 Claims, 5 Drawing Sheets

SELF-TAPPING STUD FOR RUBBER SUPPORTS OF SHOES, TYRES AND THE LIKE

TECHNICAL FIELD

The present invention relates to a self-tapping stud for rubber supports of shoes, tyres and the like, and to a tool for mounting said stud.

PRIOR ART

Studs of the stated type are often used to ensure correct gripping of shoes or tyres under conditions of poor adherence (for example on snow) or, in other cases, to limit shoe sole wear (for example in certain motorcycle competitions in which equilibrium is maintained with the aid of the feet).

Studs of this type currently exist comprising a body provided with a threaded portion to be connected to a rubber support (for example a shoe sole or a tyre) and, at its opposite end, a head of particularly hard material to ensure that the shoe or tyre grips the ground or to protect the sole against wear.

The threaded portion of said studs presents a cylindrical core from which a thread projects with its free helical edge contained substantially within a conical surface converging towards the free end of the thread (to facilitate its insertion into the rubber). Hence in practice the thread and core are similar to those of self-tapping wood screws.

In addition the free end of the thread (that which enters first into the rubber support when the stud is applied) presents in some cases a small cutting edge positioned substantially in a direction perpendicular to a core axis.

This stud is applied to rubber supports by a tool comprising two mutually communicating seats, the more inner seat receiving the head of the stud and the more outer its body; for its insertion, the stud is mounted on the tool with the threaded portion projecting, and is screwed into the support such that during its screwing, the stud leaves the seats naturally and remains locked in the support.

However, traditional studs and tools present numerous drawbacks, of which the most serious has proved to be the poor engagement between the traditional stud and the support, requiring threaded portions of very large dimensions to ensure good retention of the stud in the support. For the same reason (poor engagement), traditional studs are able to bend, escape and sometimes tear the rubber.

This is evidently damaging, both because considerable support thicknesses are required, and because even when very thick supports are available, very deep insertion of an extraneous component such as the stud causes problems in the overall support structure and possible damage to the support surface.

Traditional tools are also problematic as in many cases they do not enable studs to be correctly applied to a rubber support.

In this respect, the depth of the tool seat and the height of the stud head have to be calculated to achieve optimum positioning of the body within the rubber support. The stud should self-release naturally.

However because of the friction between the contacting surfaces, the stud often does not automatically leave the seats in which it is housed but, because of rotation, the threaded part tears the rubber from the support, leaving the support surface damaged and the stud badly positioned.

DISCLOSURE OF THE INVENTION

The technical aim of the present invention is therefore to provide a self-tapping stud for rubber supports of shoes, tyres and the like, and a tool for mounting said stud, by which the stated technical drawbacks of the known art are overcome.

Within the framework of this technical aim an object of the invention is to provide a stud which grips the rubber support in an optimum manner even if the threaded portions are of small dimensions (in the longitudinal direction, i.e. along the axis of the stud core).

In this manner the stud of the invention does not escape, does not bend, and can project from the rubber support to a sufficiently large extent, depending on requirements.

Another object of the invention is to provide a stud which can be applied to the rubber support without causing problems to the support structure or damage to its surface.

A further object of the invention is to provide a mounting tool for said stud which enables the stud to be applied in an extremely reliable manner, with a very low risk of tearing rubber portions of the support.

The technical aim together with these and further objects are attained according to the present invention by a self-tapping stud for rubber supports of shoes, tyres and the like together with a mounting tool for said stud, in accordance with the accompanying claims.

BRIEF DESCRIPTION OF THE DRAWINGS

Further characteristics and the advantages of the invention will be more apparent from the description of a preferred but non-exclusive embodiment of the self-tapping stud for rubber supports of shoes, tyres and the like, and the tool for mounting said stud, illustrated by way of non-limiting example in the accompanying drawings, in which.

BEST MODE FOR CARRYING OUT THE INVENTION

Figure 1:
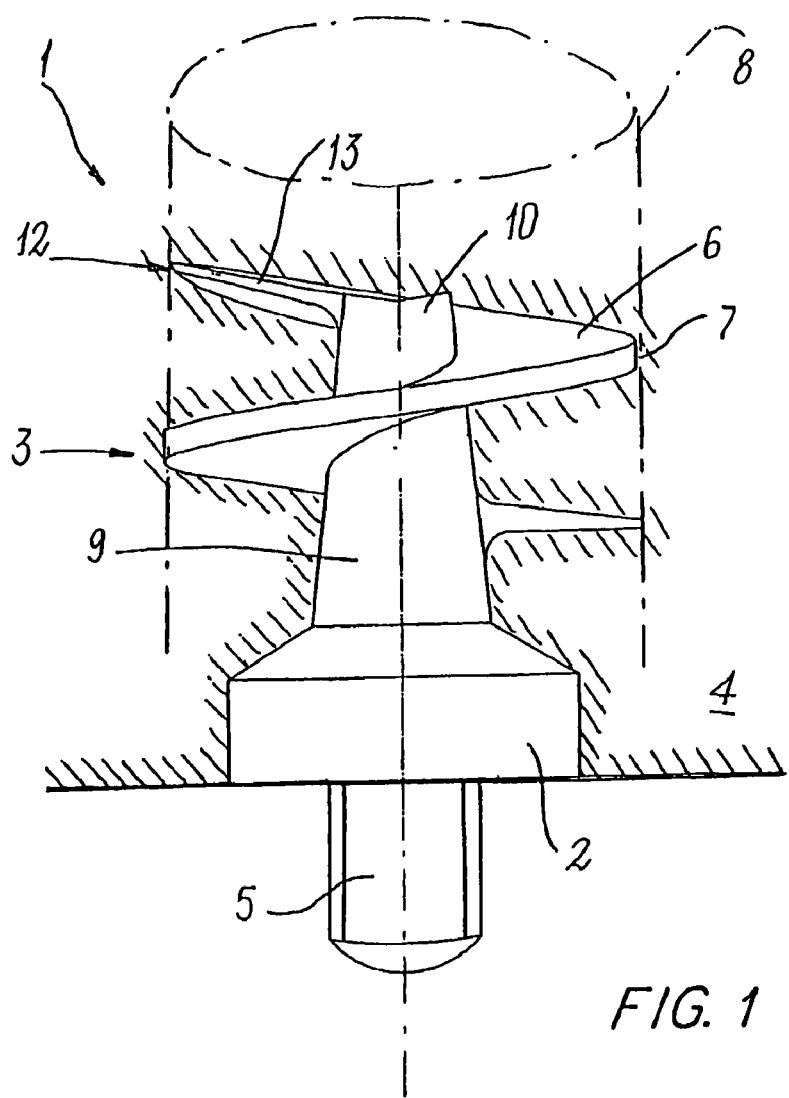
FIG. 1 is front elevation of a stud according to the invention, inserted into a rubber support such as a shoe sole or a tyre.

Said figures show a self-tapping stud for rubber supports of shoes, tyres and the like indicated overall by the reference numeral 1.

The stud 1 comprises a body 2 presenting a threaded portion 3 lockable into the rubber support 4 (the stud 1 is shown locked into the support 4 in FIG. 1) and a head 5 which projects from the support 4 when the stud is mounted.

Advantageously the threaded portion 3 presents a thread 6 provided with a free helical edge 7 which extends along a substantially cylindrical surface 8.

The threaded portion 3 also presents a substantially conical or frusto-conical core 9, with its converging end 10 disposed towards the free end of the core 9.

Advantageously the thread 6 of the threaded portion 3 is provided at its free start 12 with a cutting edge 13, which is orientated with the same inclination as the thread and could reach the centre of the core.

In this manner the thread 6 presents a good capacity for penetration and retention within the support 4 along its entire length.

Figure 2:
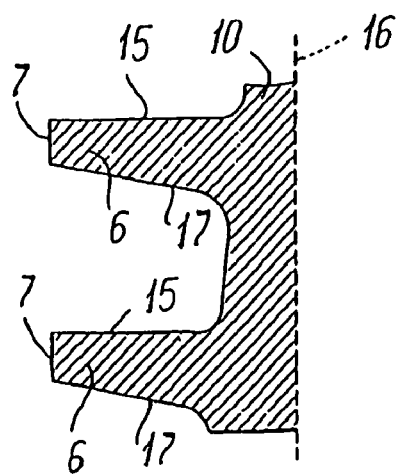
FIG. 2 is a longitudinal section (through one half of the stud of the invention.

Preferably, as shown in the accompanying figures and in particular in FIG. 2, a first thread profile 15 facing the convergent end 10 of the core 9 is substantially perpendicular to an axis 16 of the core 9, while a second thread profile 17 facing the body 2 of the core 9 is substantially inclined to the axis 16 of the core 9; preferably the second profile 17 is inclined at an obtuse angle of between 95 and 110 degrees to the axis of said core, depending on the rubber mix.

In addition, the free helical edge 7 presents a substantially flat longitudinal profile having dimensions between 0.4 and 1.6 millimetres based on the stud dimensions.

For example, for a rally tyre rubber, which is known to be very soft, the angle between the second profile 17 and the core axis is approximately 95° and the longitudinal profile of the free helical edge 7 presents a length of approximately 1.6 millimetres.

The present invention also relates to a mounting tool for studs of the stated type, the tool being indicated overall by the reference numeral 20.

Figure 3:
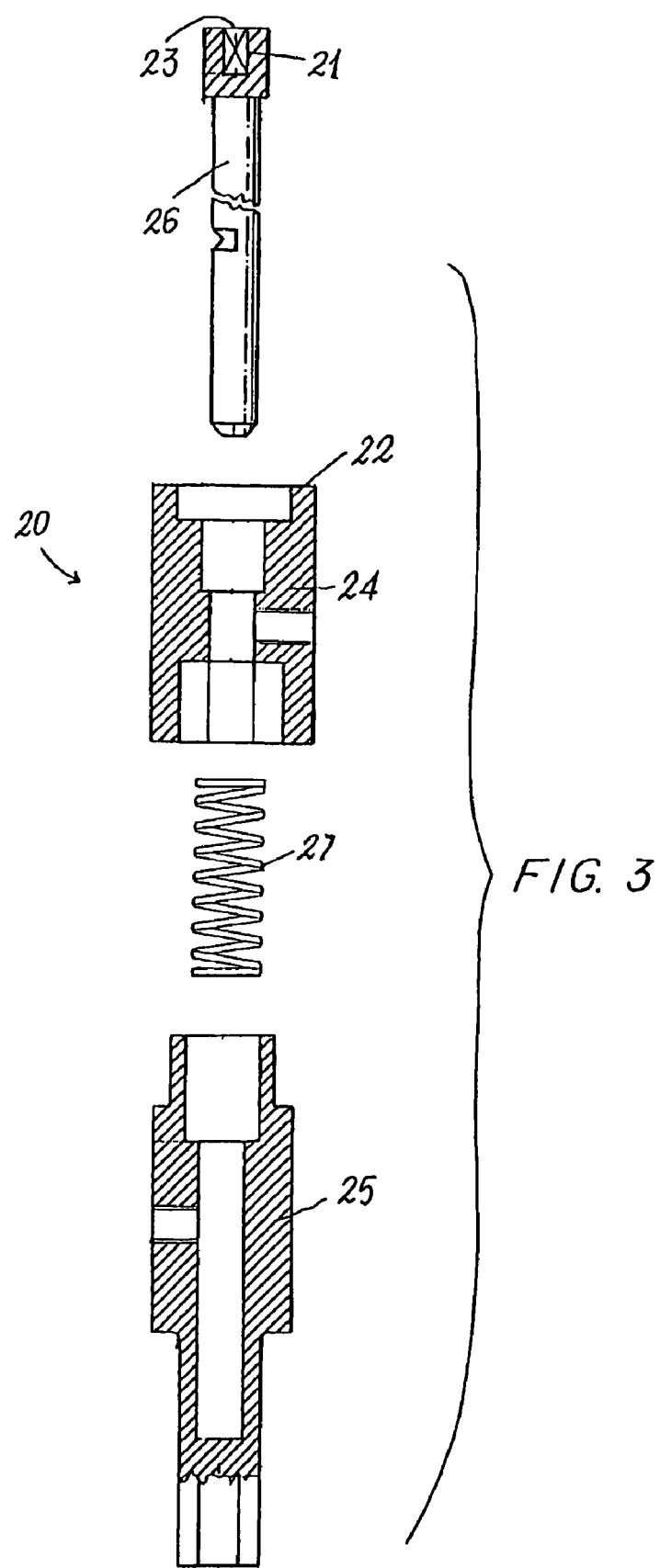
FIG. 3 is an exploded view of a first embodiment of a tool for applying the studs of the invention.
Figure 4:
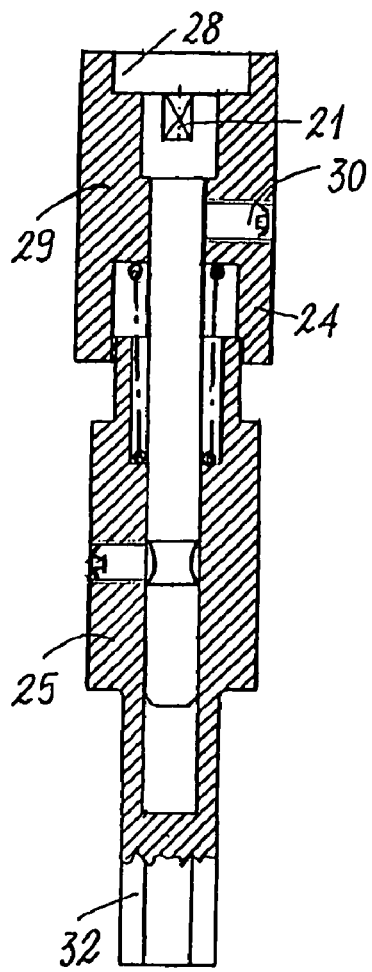
FIG. 4 shows the tool of FIG. 3 in a first operative configuration particularly for stud mounting.
Figure 5:
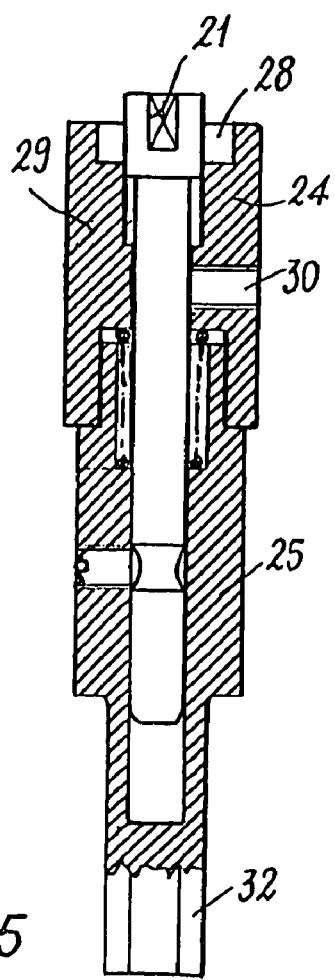
FIG. 5 shows the tool of FIG. 3 in a second operative configuration, particularly suitable for stud removal.

In a first embodiment of the tool, shown in FIGS. 3, 4, 5, the tool 20 comprises a seat 21 to receive as an exact fit the head 5 of the stud 1 and/or the body 2 if this is faceted (in the form of an ellipse 3A or having a notch 4A at its end) and an abutment surface 22 adjacent to the mouth 23 of the seat 21, so that the tool 20 enables the stud 1 to be screwed into the support 4 such that the abutment surface 4 abuts against the support 4, an indication that the stud is completely mounted being given when the surface 24A of the first element 24 abuts against the surface 25A of the second element 25.

The tool 20 also comprises a body 24, 25 in which an operating element 26 is slidable, carrying at its end the seat 21.

The body presents a first element 24 and a second element 25 which are slidable one in the other against and by the action of elastic means 27 such that the body can assume a first extended position (in which as shown in FIG. 4 the element 24 and the element 25 are spaced apart from each other longitudinally), in which the first element 24 defines a widened chamber 28 facing the seat 21 of the operating element 26, to receive as an exact fit at least a part of the body 2 of the stud 1, and a second contracted position (in which as shown in FIG. 5 the element 24 and element 25 are inserted longitudinal one into the other until they mutually abut), in which the seat 21 of the operating element 27 projects from the first element 24.

The seat also preferably comprises magnetic means 29 such as a magnet to retain the stud 1 in the seat during mounting and removal.

The tool of the first embodiment enables studs to be both applied and extracted; specifically, in the configuration shown in FIG. 4 the tool is particularly suitable for applying studs, whereas in that of FIG. 5 it is particularly suitable for extracting them.

Figure 6:
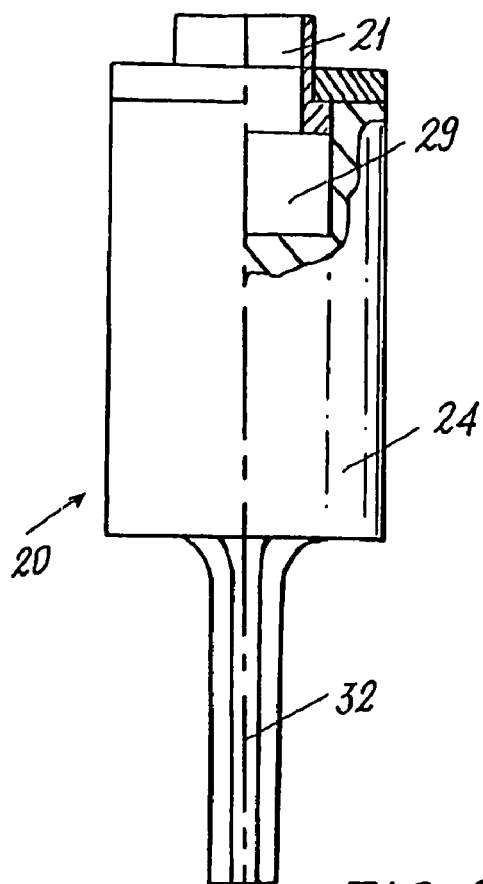
FIG. 6 is a view in partial section of a second embodiment of a stud application and removal tool according to the invention.

In a second embodiment of the tool of the invention, shown by way of example in FIG. 6, the tool 20 comprises a body 24 from which the seat 21 projects.

Magnetic means in the form of a magnet 29 are again provided in this case.

This embodiment of the tool 20 of the invention is suitable both for mounting studs 1 and for extracting them.

Figure 7:
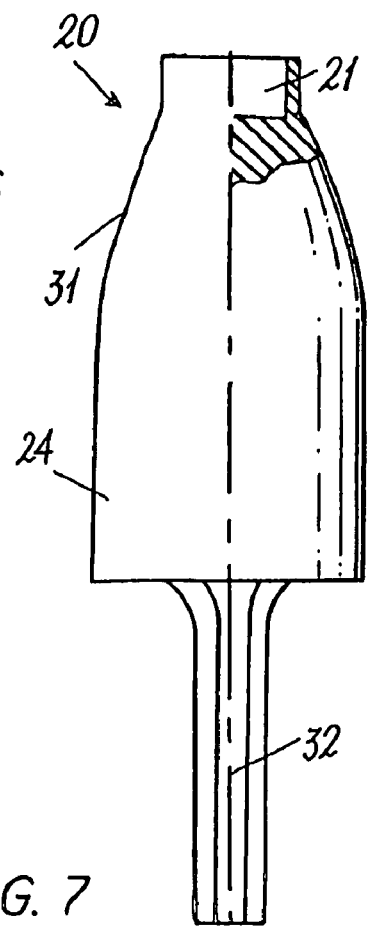
FIG. 7 is a view in partial section of a third embodiment of a stud application and removal tool.

In a third embodiment of the tool, shown by way of example in FIG. 7, is the tool 20 comprises the body 24 from which the seat 21 projects, the body 24 presenting close to said seat an end portion 31 which converges to facilitate visibility in the seat region.

This embodiment of the tool is particularly suitable for removing studs 1, as it provides high visibility in the seat region; the tool can evidently also be used for mounting.

In all the described embodiments, the tool 20 presents a faceted shank 32 for its connection to an electric screwdriver or drill, enabling the studs to be applied easily and quickly; in other examples the tool can be used with a manual handgrip.

Figure 8:
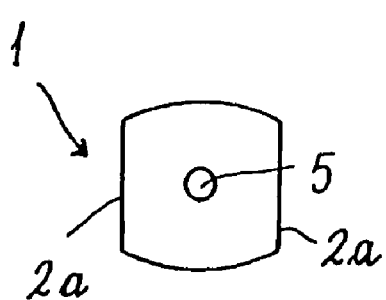
FIG. 8 is a plan view of the stud body part in another embodiment.
Figure 9:
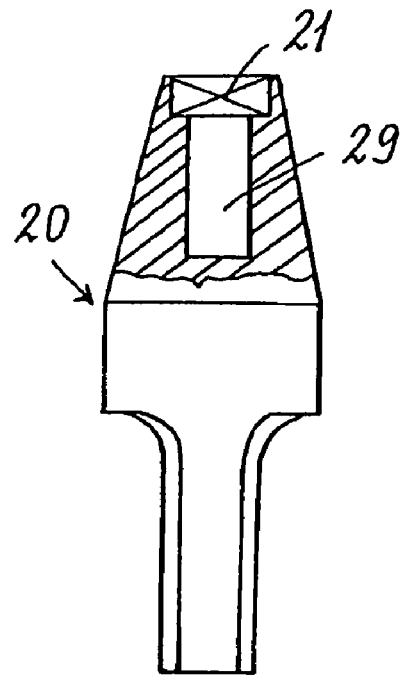
FIG. 9 is a view in partial section of a tool particularly suitable for mounting or removing the stud of FIG. 8.
Figure 10:
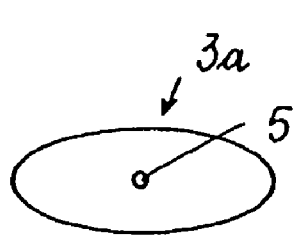
FIGS. 10-12 show other embodiments of the stud according to the invention.
Figure 11:
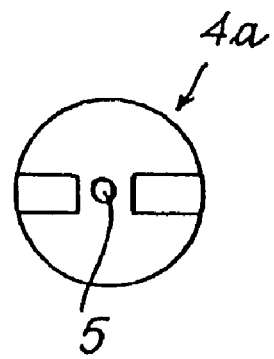
Figure 12:
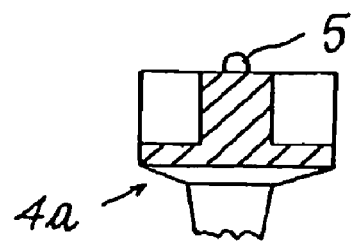

In a further embodiment shown in FIG. 8, the stud has its body 2 elliptically faceted at 3A and notched at 2a, with the head 5 presenting rounded or round profiles. Correspondingly the mounting and/or removal tool 20 presents a very wide seat 21 for receiving the faceted portions of the body. Adjacent to the seat 21 this tool carries the retention magnet 29.

The operation of the self-tapping stud for rubber supports of shoes, tyres and the like and of the mounting tool for said stud according to the invention are apparent from that described and illustrated, and is substantially as follows.

With reference to the first embodiment of the tool 20, mounting is achieved by setting the tool in the configuration shown in FIG. 4, enabling it to correctly receive the stud 1.

The stud 1 is then inserted by inserting its head 5 into the seat 21 and its body 2 at least partially into the wide chamber 28 (the body 2 is preferably completely housed in the wide chamber 28).

At this point the threaded portion 3 of the stud 1 can be rested against the surface of the rubber support 4 and, by exerting pressure, be screwed into said support.

Insertion is very simple because the cutting edge 13 has the same inclination as the thread and the thread presents large longitudinal dimensions (pitch), the connection obtained being very secure because of the large surface of the thread 6 which is obtained by making the free edge of the thread 6 with an obtuse angle along the cylindrical surface 8 and by making the core 9 cylindrical to increase the dimensions of the thread for gripping along the free portion of the stud 1.

The stud is extracted with the tool of FIGS. 3-5 by firstly setting the tool in the configuration of FIG. 5; the head of the stud 1 (which projects from the support) is then inserted into the seat 21 and the tool rotated to unscrew the stud.

When the tool is changed over from one configuration to another, it is locked by a setscrew 30.

The magnet 29 enables the stud to be retained within the seat 21, 28 until it has been brought into contact with and properly positioned on the support.

The second embodiment of the tool is used by inserting the head 5 of the stud 1 into the seat 21 of the tool 20 and then rotating the tool 20 while pressing it against the surface of the support to screw in the stud 1 (the stud is mounted when the surface 22 abuts against the support 4).

This tool can also be used for unscrewing, although for this function the third embodiment of the tool 20 is particularly suitable.

The third embodiment of the tool is particularly suitable for unscrewing because it provides excellent visibility around the seat 21, enabling the head 5 of the stud 1 projecting from the support to be easily and quickly inserted therein; it can also be used for screwing and hence for mounting studs in the rubber support.

When the tool has been mounted on the head it merely needs to be rotated to unscrew the stud.

It has been found in practice that the self-tapping stud for rubber supports of shoes, tyres and the like and the tool for mounting said stud of the invention are particularly advantageous because studs can be very securely fixed into a rubber support without damaging the support.

The self-tapping stud for rubber supports of shoes, tyres and the like and the tool for mounting said stud conceived in this manner are susceptible to numerous modifications and variants, all falling within the scope of the inventive concept; moreover all details can be replaced by technically equivalent elements.

In practice the materials used and the dimensions can be chosen at will according to requirements and to the state of the art.

The invention claimed is:

1. A self-tapping stud for rubber supports of shoes, tyres and the like, comprising a body presenting a threaded portion fixable into said rubber support and a head which projects from said support when said stud has been mounted, characterised in that said threaded portion presents a thread provided with a free helical edge which extends along a cylindrical surface; in that said threaded portion presents a core which is conical or frusto-conical having sloped sides for a length of said threaded portion; and in that said threaded portion presents a thread provided at its free start with a cutting edge, said cutting edge being orientated with the same inclination as said thread.

2. A self-tapping stud as claimed in claim 1, characterised in that a thread profile facing the convergent end of the core is substantially perpendicular to an axis of said core.

3. A self-tapping stud as claimed in claim 2, characterised in that a thread profile facing the body of said core is substantially inclined to an axis of said core.

4. A self-tapping stud as claimed in claim 2, characterised in that a profile facing the body of said core is inclined at an obtuse angle to an axis of said core.

5. A self-tapping stud as claimed in claim 2, characterised in that said obtuse angle is between 95 and 110 degrees.

6. A self-tapping stud as claimed in claim 1, characterised in that a thread profile facing the body of said core is substantially inclined to an axis of said core.

7. A self-tapping stud as claimed in claim 6, characterised in that said profile facing the body of said core is inclined at an obtuse angle to an axis of said core.

8. A self-tapping stud as claimed in claim 6, characterised in that said obtuse angle is between 95 and 110 degrees.

9. A self-tapping stud as claimed in claim 1, characterised in that a thread profile facing the body of said core is inclined at an obtuse angle to an axis of said core.

10. A self-tapping stud as claimed in claim 9, characterised in that said obtuse angle is between 95 and 110 degrees.

11. A self-tapping stud as claimed in claim 1, characterised in that said obtuse angle is between 95 and 110 degrees.

12. A self-tapping stud as claimed in claim 1, characterised in that said free helical edge presents a substantially flat longitudinal profile.

13. A self-tapping stud as claimed in claim 1, characterised in that said substantially flat longitudinal profile presents dimensions between 0.4 and 1.6 millimetres.

14. A self-tapping stud as claimed in claim 1, characterised in that said body (2) is faceted (2a), said part (5) presenting a rounded or round profile.

* * * * *